Figure 1:
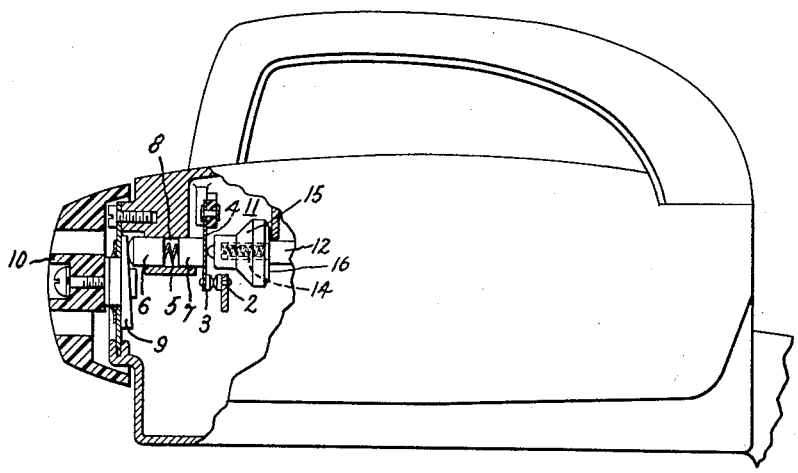

Nov. 20, 1951 — T. PRESTON — 2,575,928

MOTOR SPEED GOVERNOR

Filed April 28, 1951

Inventor:
Thomas Preston,
by *Sheridan &c.*
His Attorney.

Patented Nov. 20, 1951

2,575,928

UNITED STATES PATENT OFFICE 2,575,928

MOTOR SPEED GOVERNOR

Thomas Preston, Stratford, Conn., assignor to General Electric Company, a corporation of New York Application April 28, 1951, Serial No. 223,526

3 Claims. (Cl. 200—80)

This invention relates to governors for controlling the speed of electric motors and more particularly to governors for use with motors in electric kitchen mixers and the like.

The invention is especially concerned with improvements in governing structures such as are disclosed and claimed in the patent to Alastair D. Robertson, 2,557,765 entitled "Speed Control Mechanism," patented June 19, 1951, and assigned to the same assignee as the present invention. However, this invention may be applied to governors of the strictly speed responsive type as well as governors which are both speed and acceleration responsive, as are disclosed and claimed in the aforesaid Robertson application. Although governors embodying this invention may be employed in various other devices, the invention will be described as employed in an electric kitchen mixer, since it is particularly applicable to such a device.

In electric kitchen mixers and the like, it is necessary, due to the variety of foodstuffs handled, that means be provided for regulating the speed of the beaters or other mixing members. Since in any mixer all the beaters are ordinarily driven by a single motor, the most opportune manner of accomplishing beater speed control is to control the speed of the driving motor. In general, it is advantageous that the motor speed and thus the speed of the beaters be varied according to the average density of the mixture being stirred, and for any given mixture it is desirable that the speed remain constant under the load fluctuations caused by irregularities in the mixture. Heretofore, various governing devices have been provided for controlling the motor speed, but none of these devices has proven to be entirely satisfactory. A major objection to most of them is that their action tends to be rather erratic or unstable especially at low speeds. More particularly, in some cases their governing action results in hunting of the motor. Another objection to a great many of these conventional governors is that their response time is too slow to produce a substantially constant speed.

It is an object of this invention, therefore, to provide a new and improved speed governor for electric motors.

Another object of this invention is to provide a new and improved motor speed governor which will maintain a given motor speed under fluctuating load conditions.

A further object is to provide a motor speed governor whose speed controlling action is equally stable at all desired motor speeds, low or high.

This invention also has as its object the provision of a motor speed governor having such a speed response that it is particularly adapted for use in electric mixers or the like.

In this invention, the motor speed is controlled by the opening and closing of a spring biased switch member which is connected serially in the motor supply circuit. The bias on the switch member is partially supplied from a compressible spring member, and the biasing force therefrom may be varied by means of a manually operable cam member. The force necessary to operate the switch member is supplied by a centrifugal governor which is mounted on the shaft of the motor. Upon the motor reaching a predetermined level of rotation, an actuated member of the governor moves axially along the shaft to operate the switch member and thus remove excitation from the motor. Also tending to move the actuating member toward the switch member are spring means which are preferably mounted in a recess provided in the end of the motor shaft. As will be more fully explained hereinafter, the action of the spring means is such that an appreciably better governing action is obtained than has heretofore been available from conventional governors.

Figure 2:
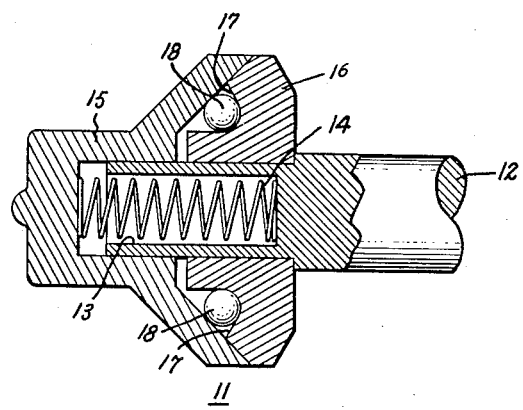

For a better and more complete understanding of the invention, together with additional objects and advantages thereof, reference should now be had to the following description and accompanying drawing in which:

Fig. 1 is a sketch of an electric kitchen mixer, partially cut-away to illustrate a preferred embodiment of this invention as utilized therein to obtain beater speed control; and Fig. 2 is an enlarged cross-sectional view of a portion of the motor speed governor shown in Fig. 1.

Referring to Fig. 1, in an electric kitchen mixer 1, the beater drive motor (not shown) is energized through a power supply circuit including in series relationship a manually operated two-position, on-off switch (not shown) and the circuit breaking contacts 2 and 3. Contact 2 is fixed in position while contact 3 is movable through its mounting on a flat resilient spring member or contact arm 4. Contact arm 4 with contact 3 thus forms a spring biased switch member which will remain in the closed position unless acted upon by other forces. It is by means of the opening and closing of this switch member that speed control of the beater drive motor is obtained.

Also tending to bias contact arm 4 to the closed position is a helical spring 5 which is disposed in a cylindrically shaped split housing formed by the movable insulating members 6 and 7. This split housing is positioned in a slot 8 provided in the mixer frame for that purpose. By moving compression member 6 axially in slot 8 so as to compress spring 5, the spring bias applied to contact arm 4 may be varied. The movement of compression member 6 is accomplished through rotation of a cam 9 on which the compression member rides. The cam is itself actuated by the manual speed-control knob 10. Thus, changing the setting of knob 10 changes the force required to separate contact 3 from contact 2.

The forces necessary to overcome the combined spring bias to open contacts 2 and 3 are supplied by a centrifugal governor 11 in which is embodied this invention. As is shown in Fig. 2, governor 11 is mounted on a shaft 12 driven by the beater drive motor. The end of shaft 12 is provided with an axially extending recess 13, and in recess 13 are disposed spring means, here comprising a helical spring 14. Spring 14 acts to bias an actuated flange member 15, which is slidably and rotatably positioned on the end of shaft 12, against contact arm 4. It is through the movement of member 15 that contact 3 is removed from engagement with contact 2.

As is disclosed and claimed in the aforementioned Robertson patent the rear face of member 15 mates with the front face of an actuating flange member 16 which is firmly secured to shaft 12, the mating faces being both preferably frustroconically shaped. The front face of member 16 is provided with a plurality of circumferentially spaced recesses 17. These recesses are preferably declined from the front face of member 16 in the direction of rotation of the member and at an angle to the drive shaft 12 so that the weights or balls 18 positioned therein are responsive both to the speed and to the acceleration of shaft 12. The speed responsive action is due to centrifugal forces, while the acceleration responsive action is due to inertia forces. Thus, when shaft 12 is rotated at a constant speed, balls 18 are centrifugally moved against the rear face of member 15 with a force proportional to the shaft speed; whereas, when shaft 12 is accelerated rapidly, the inertia of balls 18 causes them to accelerate less rapidly than member 16 and thereby to move along tapered recesses 17 into contact with member 15 with a force proportional to the rate of shaft acceleration.

The movement of balls 18 against the rear face of member 15, of course, creates a force tending to move it toward contact arm 4. This force is aided by the action of spring 14, and when the two forces together are great enough, member 15 moves against contact arm 4 and separates contact 3 from contact 2. This opens the motor supply circuit and removes excitation from the motor. The motor and its connected load including shaft 12 then begin to slow down. When the speed of shaft 12 has decreased to a lower level, the spring bias tending to return contact arm 4 to the closed position again becomes greater than the force from member 15 trying to keep it in the open position. The contact arm then recloses contacts 2 and 3 and the motor is once again energized. The motor again begins to accelerate and continues to do so until the level of rotation is reached where member 15 moves to operate contact 4.

Thus, the speed control of the motor is accomplished by causing it to accelerate and decelerate in a narrow band between two predetermined levels of rotation. The mean or average speed of the motor is set by varying the bias applied to contact arm by spring 5.

The action of spring 14 is such that a more smoothly operating speed control is obtained than has heretofore been possible in governors of this general type. Previously, because actuated member 15 was not held solidly against contact arm 4, a bouncing action could occur between the two members, resulting in erratic governor operation. The action of spring 14, by holding contact arm 4 and actuator 15 in firm contact, minimizes the bouncing and aids in producing smoother operation. Furthermore, where previously member 15 was forced forward solely by the forward component of the centrifugal or inertia forces on balls 18, the addition of spring 14 constitutes a resilient support tending to mask the effects of the intermittent sharp impact between balls 18 and member 15. This masking effect, by smoothing out what otherwise would be rapid fluctuating movements of member 15, also aids appreciably in the attainment of a better governing operation.

While there has been described what at present is considered to be the preferred embodiment of this invention, it will be obvious to those skilled in the art that various changes and modifications may be made therein without departing from the invention and it is, therefore, aimed in the appended claims to cover all such changes and modifications as fall within the true spirit and scope of the invention.

What I claim as new and desire to secure by Letters Patent of the United States is:

1. The combination with an electric motor having a shaft, of a governor structure for regulating the speed of the motor comprising a fixed contact, a spring contact arm fixed at one end and provided with a movable contact which engages said fixed contact, said contact arm extending across the end of the shaft and being biased to hold the movable contact in engagement with the fixed contact, an adjustable spring biased member which engages said contact arm on it side remote from the shaft which serves also to bias the movable contact toward the fixed contact, an axially slidable member positioned on the shaft having a forward end which engages said contact arm on its other side and in opposed relation to said spring biased member, its rear end having a rearwardly facing flat surface, spring means which engages and biases said slidable member into engagement with said contact arm, said spring means having a biasing force less than the combined biasing force of said spring arm and said spring biased member, and means carried by the shaft and movable axially thereof in response to the speed of rotation of the shaft having parts which push against said flat surface to move the slidable member axially to thus move said contact arm to effect opening of said contacts.

2. The combination with an electric motor having a shaft, of a governor structure for regulating the speed of the motor comprising a fixed contact, a spring contact arm fixed at one end and provided with a movable contact which engages said fixed contact, said contact arm extending across the end of the shaft and being biased to hold the movable contact in engagement with the fixed contact, such shaft end having an axially extending recess therein, an adjustable spring biased member which engages said contact arm on its side remote from the shaft which serves also to bias the movable contact toward the fixed contact, an axially slidable member positioned on the shaft having a forward end which engages said contact arm on its other side and in opposed relation to said spring biased member, its rear end having a rearwardly facing flat surface, spring means positioned in said shaft end recess which engages and biases said slidable member into engagement with said contact arm, said spring means having a biasing force less than the combined biasing force of said spring arm and said spring biased member, and means carried by the shaft and movable axially thereof in response to the speed of rotation of the shaft having parts which push against said flat surface to move the slidable member axially to thus move said contact arm to effect opening of said contacts.

3. The combination with an electric motor having a shaft, of a governor structure for regulating the speed of the motor comprising a fixed contact, a spring contact arm fixed at one end and provided with a movable contact which engages said fixed contact, said contact arm extending across the end of the shaft and being biased to hold the movable contact in engagement with the fixed contact, an adjustable spring biased member which engages said contact arm on its side remote from the shaft which serves also to bias the movable contact toward the fixed contact, an axially slidable member positioned on the shaft having a forward end which engages said contact arm on its other side and in opposed relation to said spring biased member, its rear end having a rearwardly facing flat surface, a spring carried by the shaft which engages and biases said slidable member into engagement with said contact arm, said spring having a biasing force less than the combined biasing force of said spring arm and said spring biased member, a member fixed on the shaft having a surface opposed to said rearwardly facing flat surface, and means carried by said fixed member between said opposed surfaces and movable axially of the shaft in response to the speed of rotation of the shaft which pushes against the flat surface on the axially slidable member to move such axially slidable member and thus move the contact arm to effect separation of said contacts.

THOMAS PRESTON.

REFERENCES CITED

The following references are of record in the file of this patent:

UNITED STATES PATENTS

| Number | Name | Date |
|---|---|---|
| 2,281,711 | Peck | May 5, 1942 |

FOREIGN PATENTS

| Number | Country | Date |
|---|---|---|
| 638,928 | Germany | Nov. 26, 1936 |